(No Model.)

A. WOOD.
CURTAIN RING.

No. 364,197. Patented May 31, 1887.

WITNESSES

INVENTOR
Alfred Wood
by Geo. H. Lothrop
ATTORNEY

United States Patent Office.

ALFRED WOOD, OF DETROIT, MICHIGAN, ASSIGNOR OF ONE-THIRD TO EDWIN S. BARBOUR, OF SAME PLACE.

CURTAIN-RING.

SPECIFICATION forming part of Letters Patent No. 364,197, dated May 31, 1887.

Application filed March 16, 1887. Serial No. 231,129. (No model.)

*To all whom it may concern:*

Be it known that I, ALFRED WOOD, of Detroit, in the county of Wayne and State of Michigan, have invented a new and useful Improvement in Curtain-Rings, of which the following is a specification.

My invention consists in an improvement in curtain-rings, hereinafter fully described.

Figure 1:
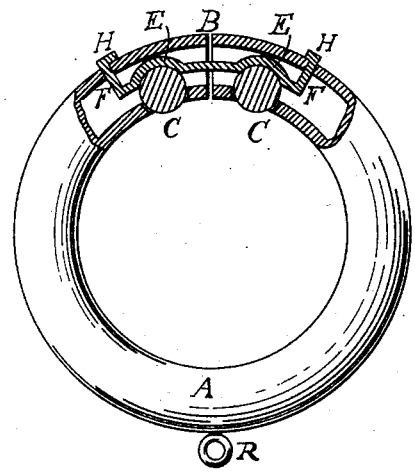
Figure 2:
Figure 3:

Figure 1 is an elevation of the ring, partly in section; and Figs. 2 and 3 are respectively a plan and a side elevation of the rivet and ball-bearing.

A represents a curtain-ring, usually made of a short piece of brass tubing bent into the form of a circle. As now made the ends of the bent tubing are brazed or soldered together. Instead of fastening the ends in this way, I fasten them together by a rivet.

D represents a rivet adapted to slip into the ends of the tubing and have its ends F turned upward, passed through slots in the upper wall of the ring, and turned over, as shown at H, or fastened in any other suitable manner, so as to hold the two ends of the tubing (indicated at B) close together and form a complete ring.

E E represent concave bearings stamped in the under side of rivet D, for the purpose of affording bearings for two small rollers or balls, C, which may be made of wood or metal, and which, when seated in the bearings E, project through the inner wall of the ring A, as shown in Fig. 1, so that when said ring is put upon a curtain-pole the balls C C will rest upon the pole and permit the ring A to travel easily and noiselessly along the pole.

R represents the usual ring, with which a curtain-hook engages, secured to the main ring A.

What I claim as my invention, and desire to secure by Letters Patent, is—

1. In a curtain-ring, a rivet adapted to secure the ends of the ring together and having therein bearings for rollers or balls, and rollers resting in the bearings in said rivet and projecting through the inner wall of the ring, substantially as shown and described.

2. In combination with ring A, made of a piece of tubing bent into circular form, the rivet D, having its ends secured to the adjacent ends of the tubing and having therein the concave bearings E, and the balls C, resting in the bearings E and projecting through the inner surface of the ring A, substantially as shown and described.

ALFRED WOOD.

Witnesses:
 SUMNER COLLINS,
 C. M. MASON.